M. W. KIDDER.
Process and Apparatus for the Manufacture of Illuminating Gas.
No. 168,904. Patented Oct. 19, 1875.

Witnesses
John E Crane
Wm S Brown

Inventor
Moses W. Kidder

M. W. KIDDER.
Process and Apparatus for the Manufacture of
Illuminating Gas.
No. 168,904. Patented Oct. 19, 1875.
15 Sheets--Sheet 7.
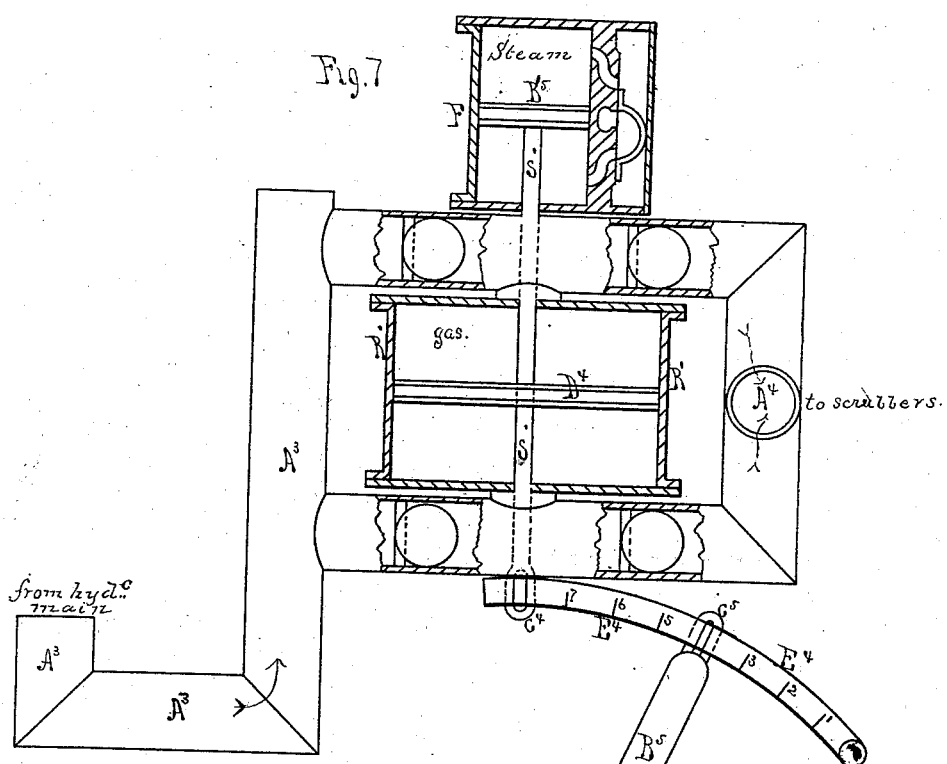
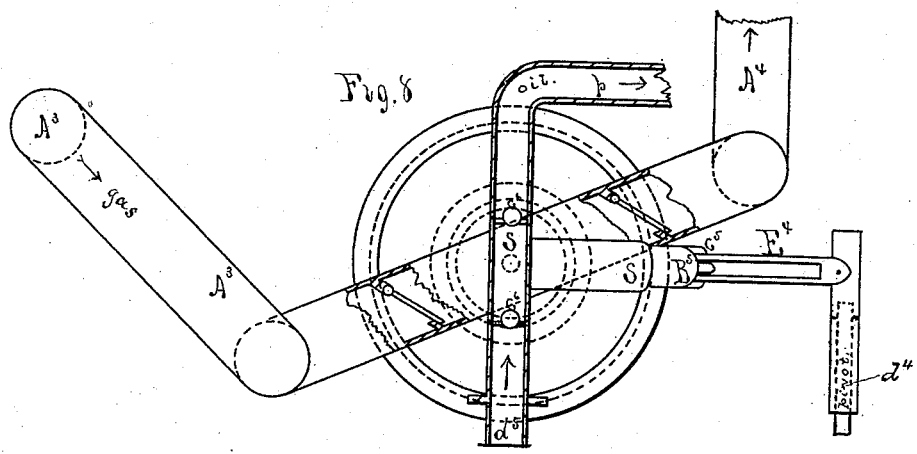
Witnesses
John Elevane
Wm S Brown
Inventor
Moses W. Kidder M. W. KIDDER.
Process and Apparatus for the Manufacture of Illuminating Gas.

No. 168,904.

15 Sheets--Sheet 8.

Patented Oct. 19, 1875.

Witnesses
John E. Crane
Wm. B. Brown

Inventor
Moses W. Kidder

M. W. KIDDER.
Process and Apparatus for the Manufacture of Illuminating Gas.

No. 168,904. Patented Oct. 19, 1875.

15 Sheets--Sheet 10.

Witnesses
John E Crane
Wm S Brown

Inventor
Moses W. Kidder

M. W. KIDDER.
Process and Apparatus for the Manufacture of Illuminating Gas.

No. 168,904.

15 Sheets--Sheet 14.

Patented Oct. 19, 1875.

Witnesses
John E. Crane
Wm. S. Brown

Inventor
Moses W. Kidder

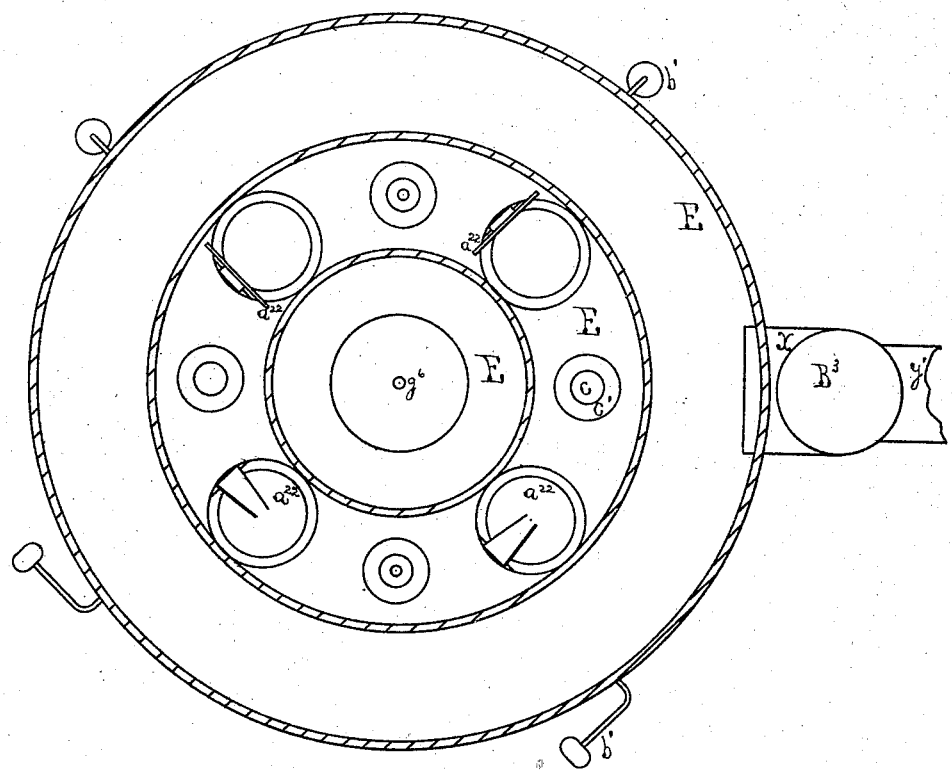

UNITED STATES PATENT OFFICE.

MOSES W. KIDDER, OF BOSTON, ASSIGNOR TO HIMSELF AND PERSON NOYES, OF LOWELL, MASSACHUSETTS.

IMPROVEMENT IN PROCESSES AND APPARATUS FOR THE MANUFACTURE OF ILLUMINATING-GAS.

Specification forming part of Letters Patent No. 168,904, dated October 19, 1875; application filed May 17, 1875.

*To all whom it may concern:*

Be it known that I, MOSES W. KIDDER, of Boston, in the county of Suffolk and State of Massachusetts, have invented certain new and useful Improvements in Coal-Gas Apparatus, and in the Process of Generating or Producing Gas therein, of which the following is a full, clear, and exact description, reference being had to the accompanying drawings forming part of this specification, in which—

Figure 1:
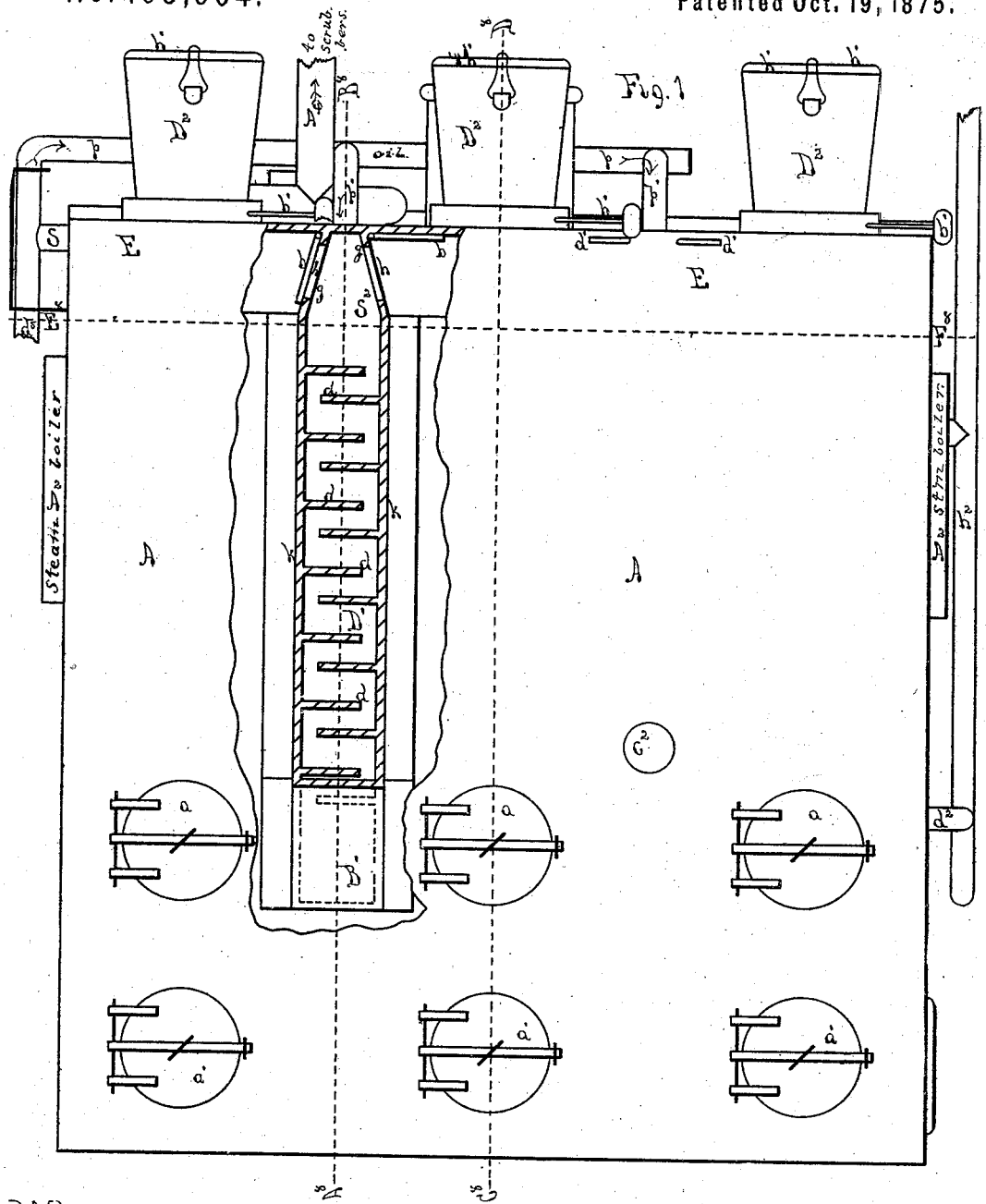
Figure 2:
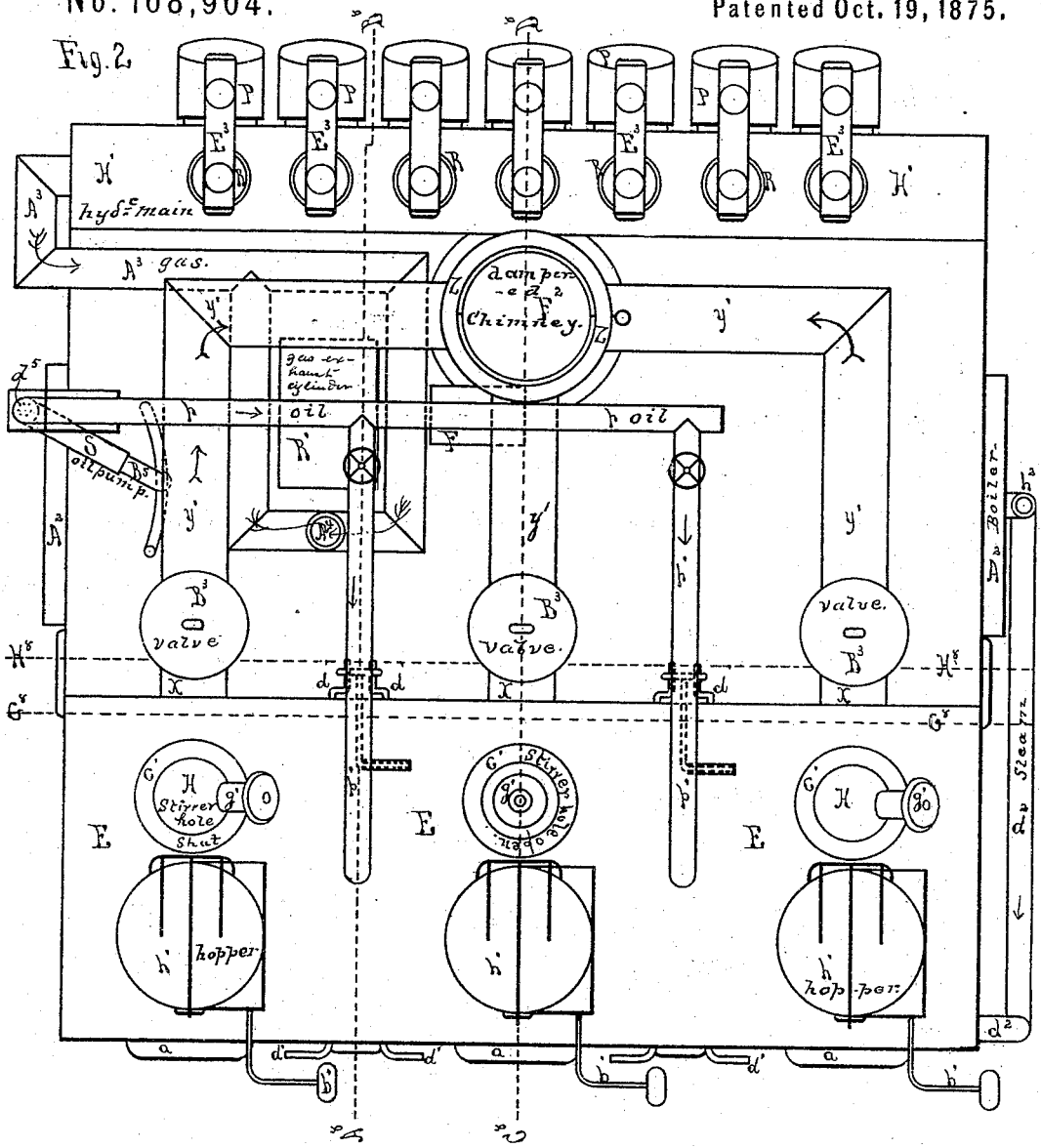
Figure 3:
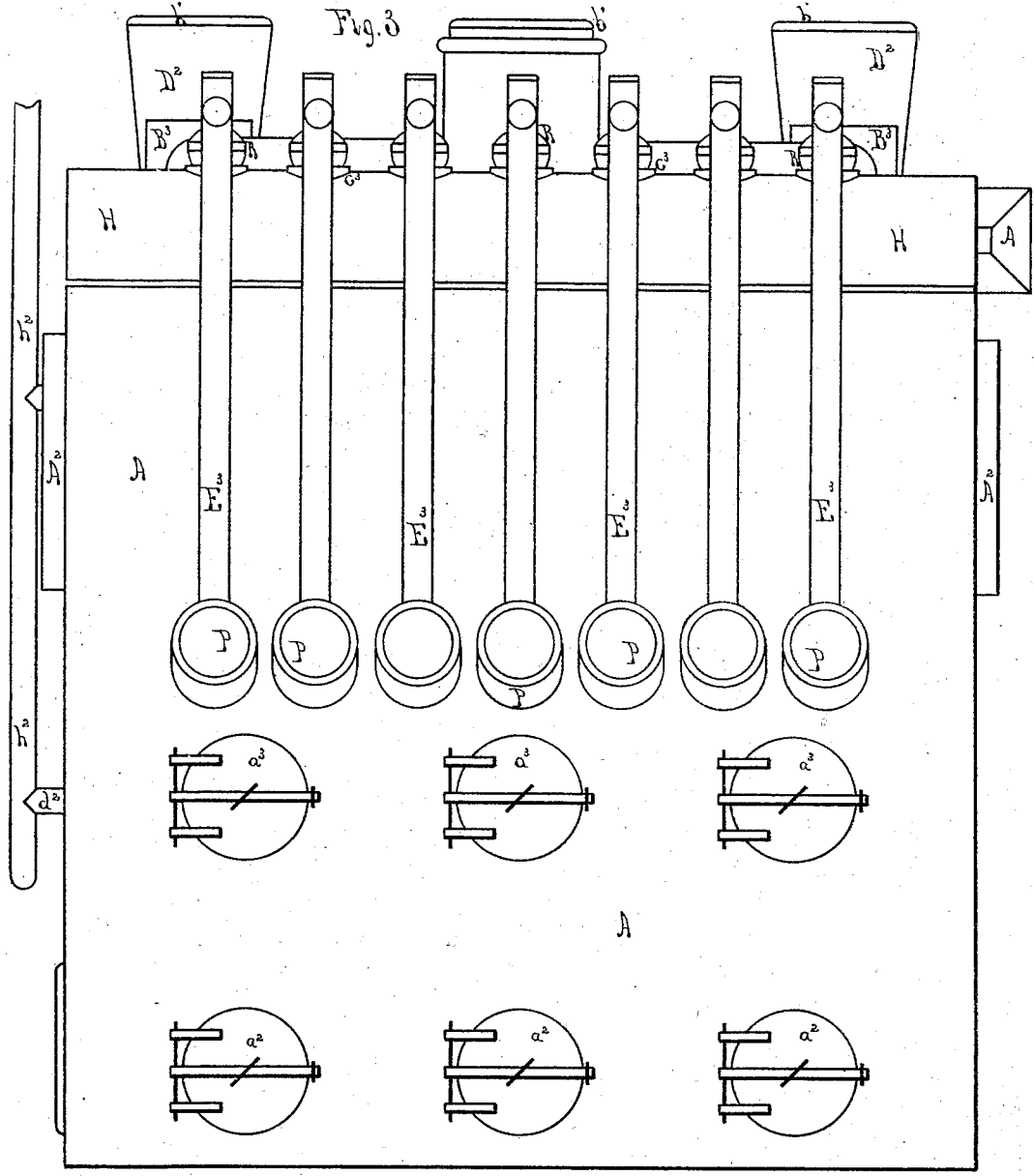
Figure 4:
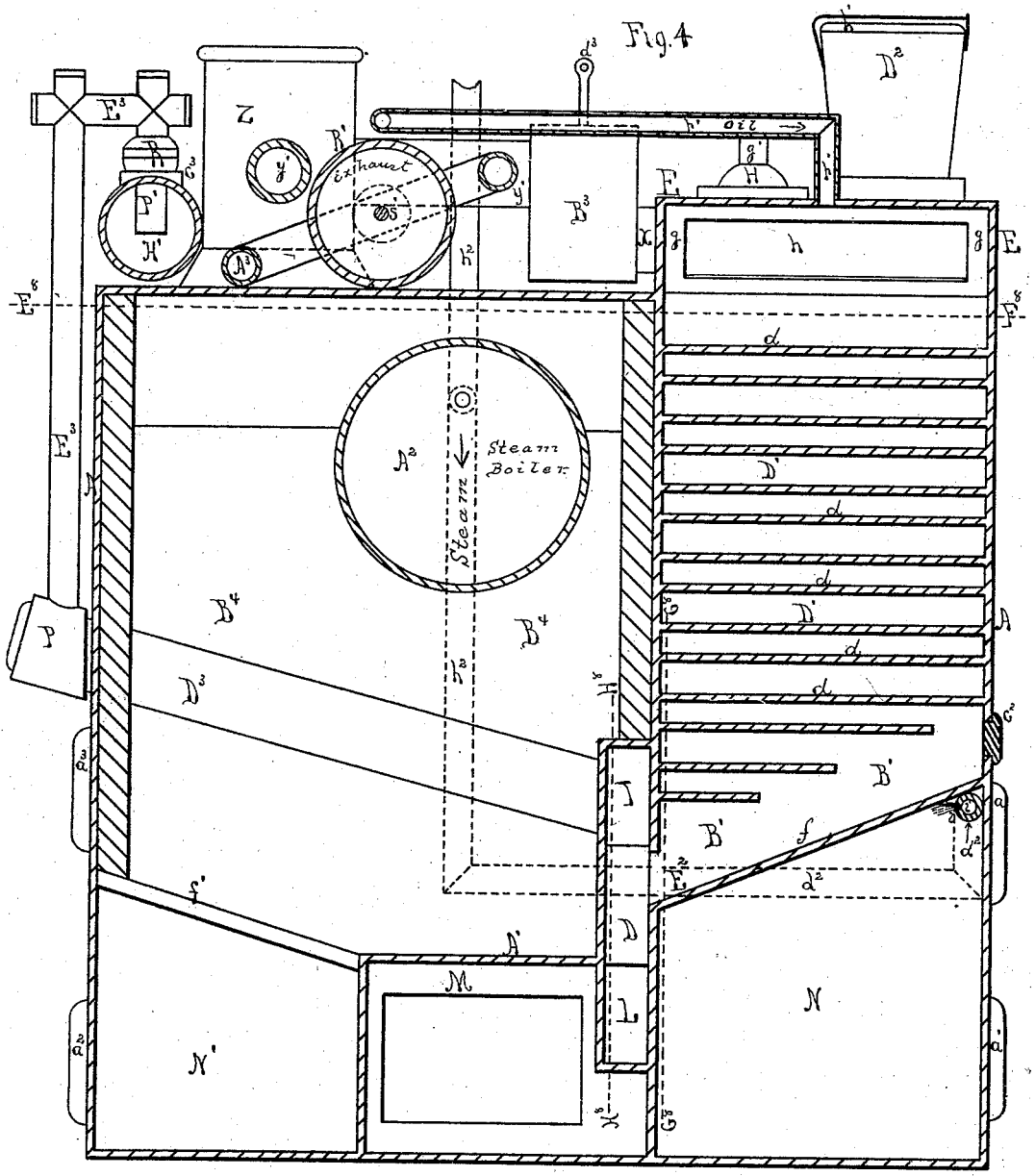
Figure 5:
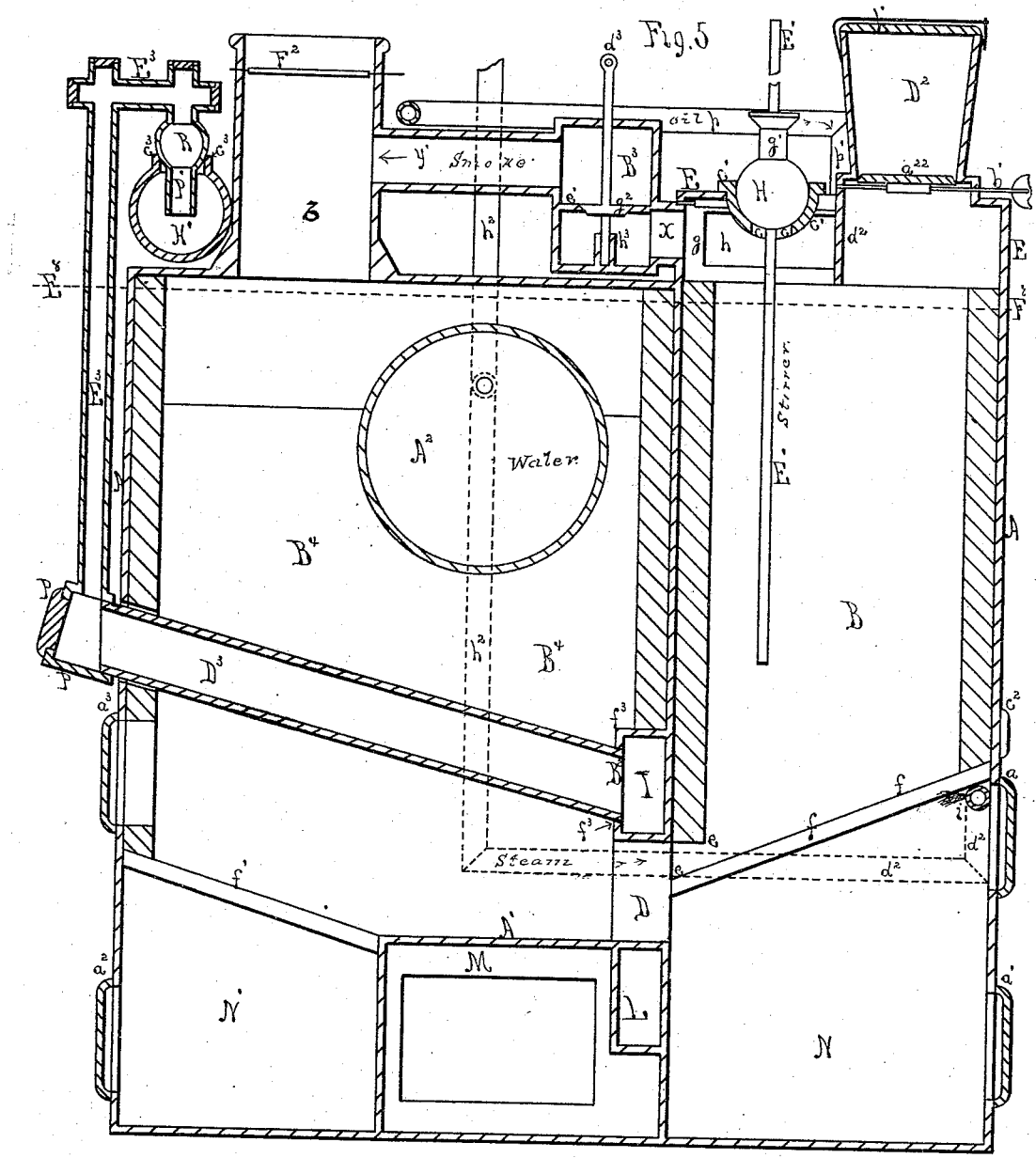
Figure 6:
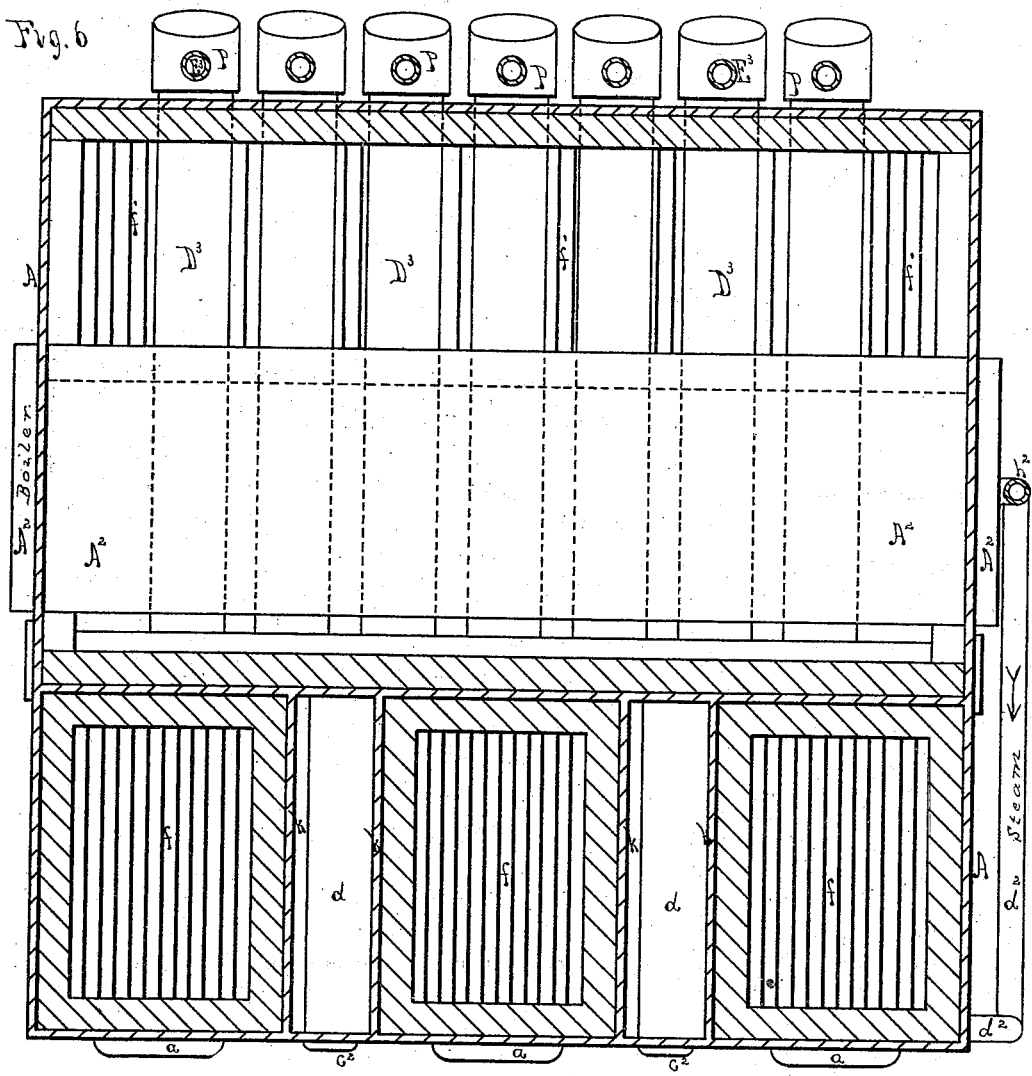
Figure 9:
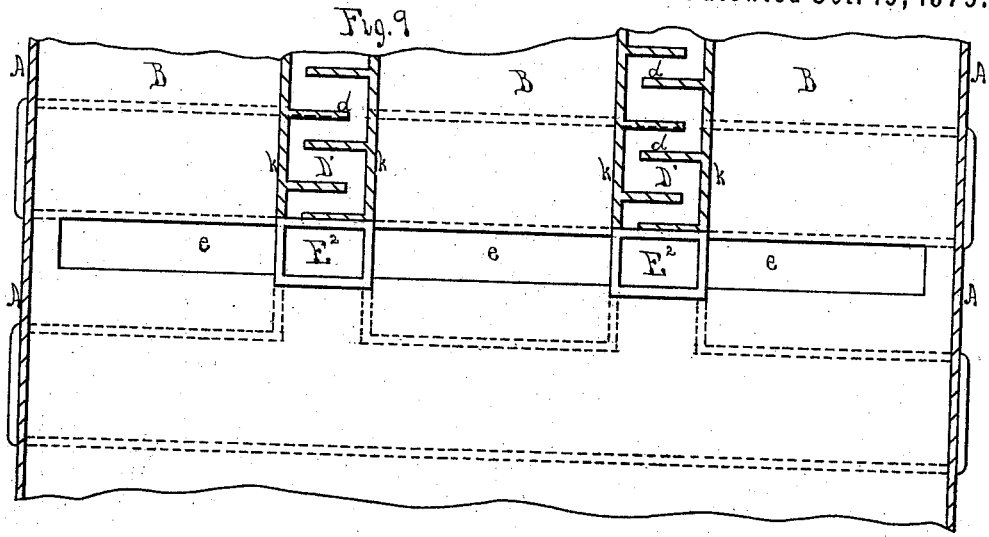
Figure 10:
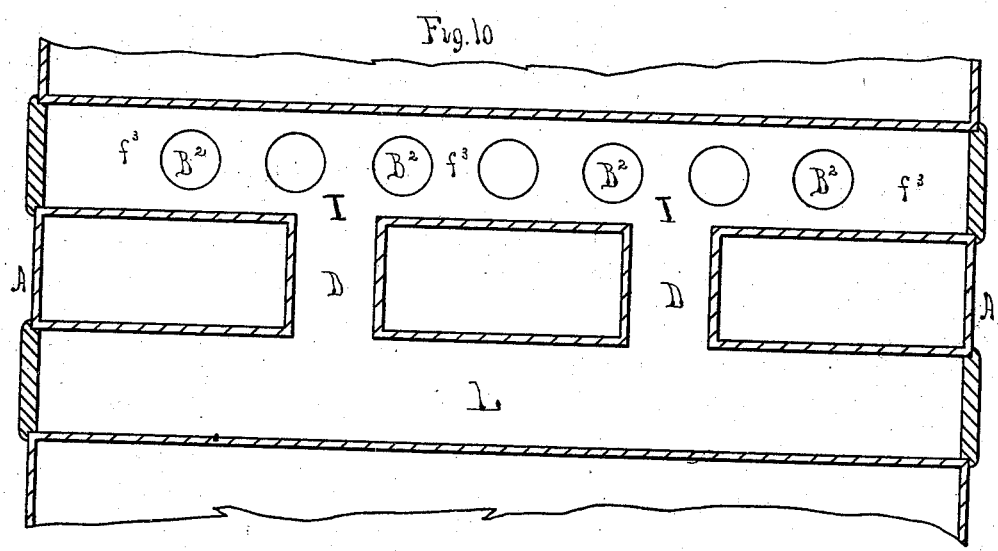
Figure 11:
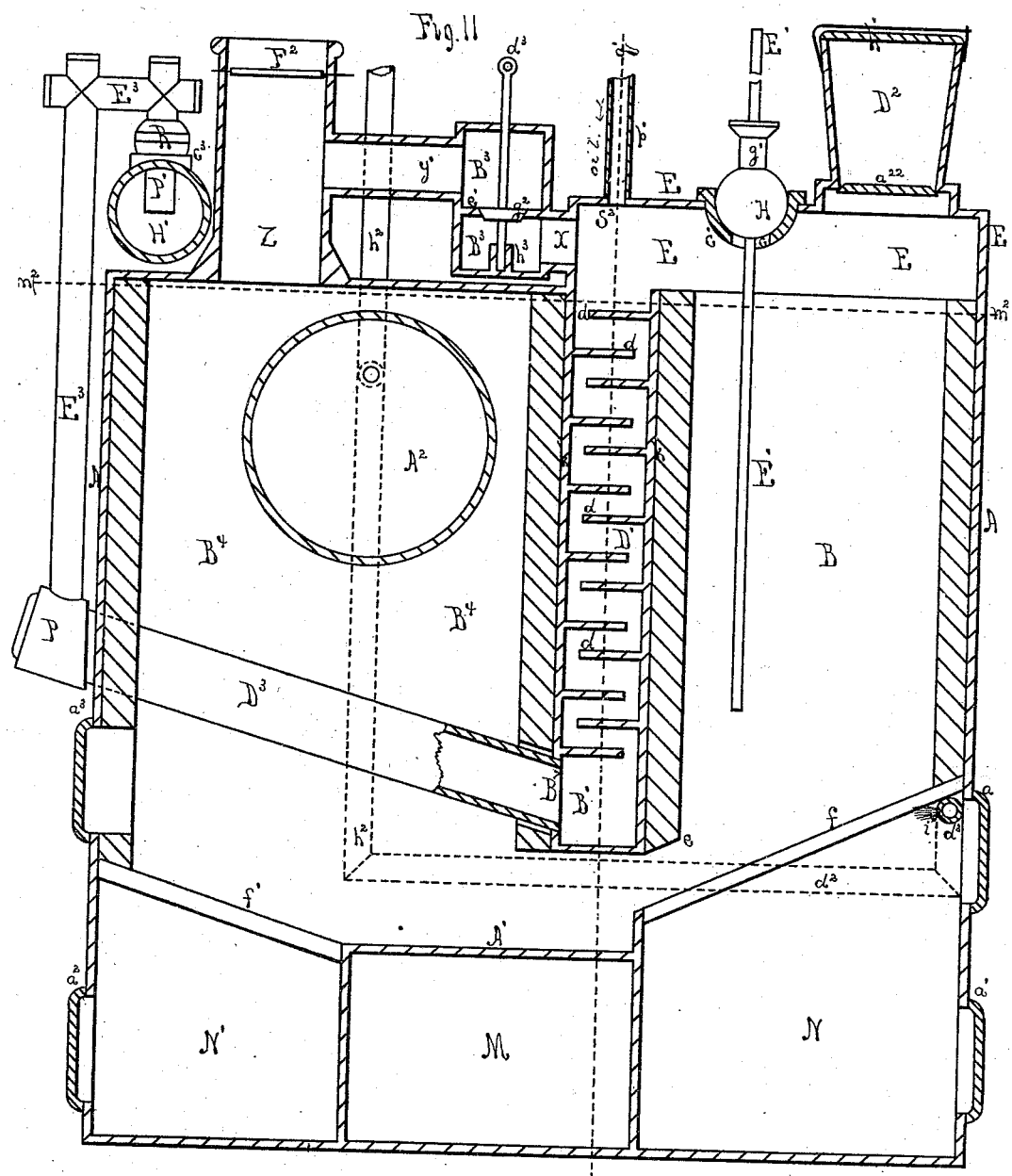
Figure 12:
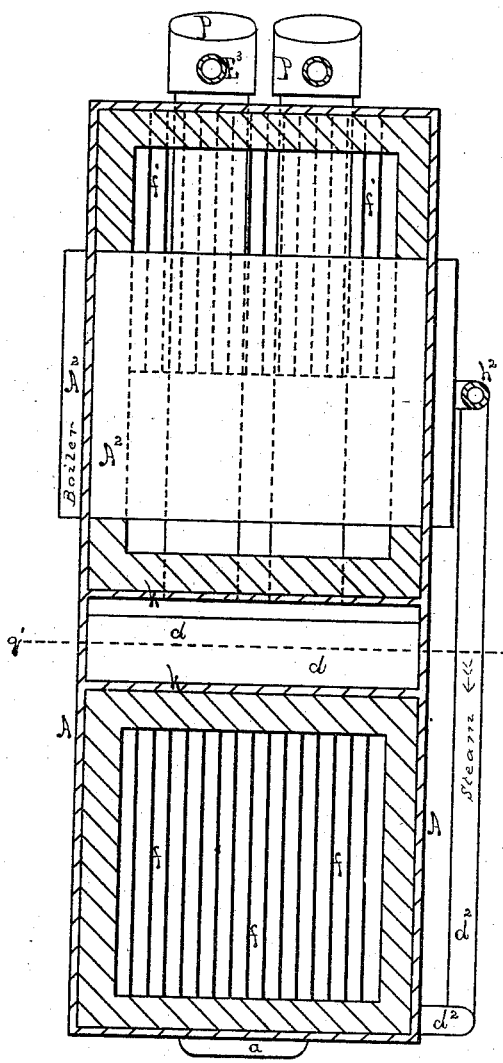
Figure 13:
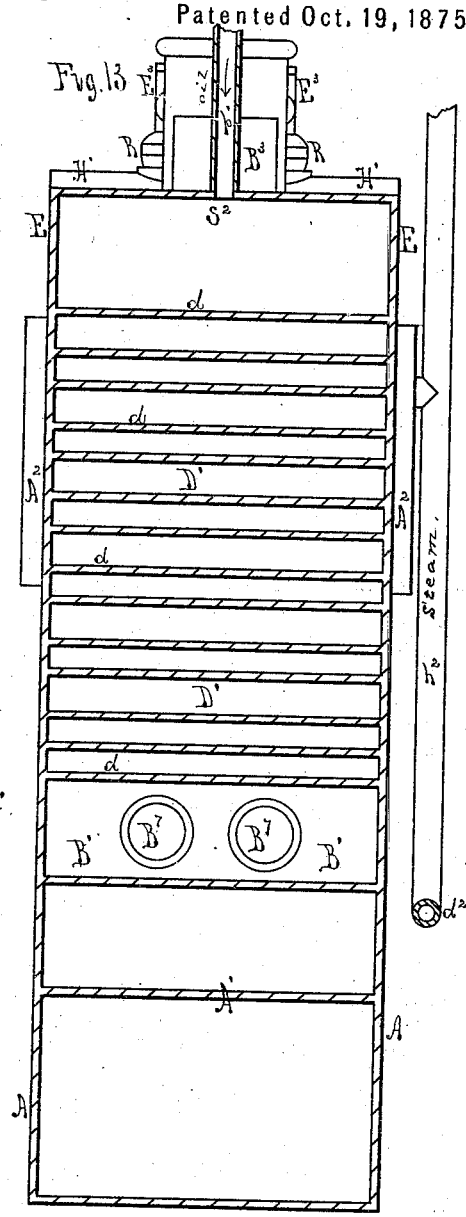

Figure 1 represents a front side elevation, partly in section; Fig. 2, a plan or top view; Fig. 3, a rear side elevation. Figs. 4 and 5 represent each a vertical cross-section, the former on the line $A^8 B^8$, and the latter on the line $C^8 D^8$ of Figs. 1 and 2. Fig. 6 represents a horizontal plane section on the line $E^8 F^8$ of Fig. 1. Fig. 7 represents a detached plan or top view of the gas exhausting and hydrocarbon-feeding apparatus, partly in section, the same being shown in Fig. 2 in connection with the other parts. Fig. 8 represents a sectional elevation of the hydrocarbon-feed pump, with most of the connected parts in elevation. Figs. 9 and 10 represent each a vertical longitudinal section, the former on the line $G^8$, and the latter on the line $H^8$, Fig. 2, but covering only the lower part of the rear side of each coal-chamber, and gas-mixing chamber, and the front ash-pit. The plane of each last-named section is more clearly indicated by lines $G^8$ and $H^8$ in Figs. 4 and 5. Figs. 11, 12, and 13, represent a modification of the apparatus shown in the previously-described figures, Fig. 11 being a vertical cross-section like or similar to Fig. 5, but with the gas-mixing chamber $D^1$ back of the coal-chamber B, and otherwise simplified in construction, as described. Fig. 12 is a horizontal cross-section on the line $m^2$ of Fig. 11; and Fig. 13 a vertical section on the line $q'$ of Figs. 11 and 12. Figs. 14 to 19, inclusive, represent certain modifications embodying a circular or annular furnace or gas apparatus, with the gas superheating and combining or mixing retort $D^1$ in the center, Fig. 14 being a plan or top view; Fig. 15, an elevation, showing the front and one side of the apparatus. Fig. 16 is a vertical central section on the line $e^{10} f^{10}$ of Fig. 14; Fig. 17, a horizontal cross-section on the line $c^{10} d^{10}$ of Figs. 15 and 16. Fig. 18 is an inverted plan of the top portion above the line $a^{10} b^{10}$ of Figs. 15 and 16; and Fig. 19 a cross-section of one of the conduits $g^5$.

This invention consists of certain new and useful improvements in the apparatus which is used for generating or producing gas from bituminous coal, and by the combination of steam and air therewith, and from anthracite coal, and by the combination therewith of steam, air, and hydrocarbon—the latter introduced into the apparatus in the form of liquid or vapor, and, if in the form of liquid, vaporized therein. All the parts or elements and the combinations thereof, and the construction and mode of operation to produce the desired results, are hereinafter more fully described.

This invention also consists of the process, substantially as herein described, of producing illuminating-gas by means of the oils as they are distilled from bituminous coal at a low temperature, and by the combination of the vapors of the thus distilled oils with the gases resulting from the union of the carbon of the coal in vertical retorts, and the elementary gases of steam and air introduced at or near a level with the grates, and the mixed gases and vapors subsequently more thoroughly mixed and heated by passing downward through vertical heated chambers, as specified, and by passing the whole mixture of gases and vapors through highly-heated retorts, all substantially as described.

This invention also consists of the process, substantially as herein described, of producing illuminating-gas by means of the oils as they are distilled from bituminous coal at a low temperature, and by the combination of the vapors of the thus distilled oils with the additional vapor of hydrocarbon, and the gases resulting from the union of the carbon of the coal in vertical retorts, and the elementary gases of steam and air introduced at or near a level with the grates, and the mixed gases and vapors subsequently more thoroughly mixed and heated by passing downward through vertical heated chambers, as specified, and by passing the whole mixture of gases and vapors through highly-heated retorts, all substantially as described.

This invention also consists of the process, substantially as herein described, of producing illuminating-gas by means of the gases resulting from the partial combustion of anthracite coal in contact with steam, and air introduced and combined therewith near the grates of a coal-burning chamber, and by additional vapor of hydrocarbon subsequently mingled or mixed therewith, and further heated by passing downward through vertical heated chambers, as set forth, and by passing the whole mixture of gases and vapors through highly-heated retorts, all substantially as described.

This invention also consists in the process, substantially as herein described, of producing two kinds of gas at the same time in the same gas apparatus, and of delivering or conveying each said kind of gas in a different direction, and using them for different purposes; and, first, non-illuminating gas, by means of a portion of the gases resulting from the partial combustion of coal or coke in contact with steam and air introduced and combined therewith near the grates of a coal-burning chamber, and drawn off through an aperture into an adjoining chamber or furnace, and there consumed; and, second, producing illuminating-gas simultaneously with the production of the non-illuminating gas by means of a portion of the gases resulting from the partial combustion of anthracite coal or coke, and the steam and air drawn upward from the upper stratum of such incandescent coal, and by the combination therewith of hydrocarbon vaporized and mixed, and permanently combined with the coal-gas first named in heated gas-mixing chambers, or in these and highly-heated retorts, or by means of the oily vapors as they are distilled from bituminous coal at a low temperature, and vaporized and exhausted or drawn from the upper stratum of unignited coal above the burning coal, which is producing non-illuminating gas in the same coal-burning chamber, thence downward through heated gas-mixing chambers, or these and highly-heated retorts, as described.

In the said drawings, let A represent a suitable case or inclosure, the walls of which may be of metal or brick, and, if of metal, lined with brick. The top of the case and of the trunk E should be of iron, in order to properly attach the coal-feeding hoppers and other parts. This inclosure is provided with doors and openings at the front and rear, for the purpose of stirring the fire and removing ashes, and for the admission of air to support combustion of coal within. The doors $a$ and $a^1$ at the front are both below the inclined grates $f$, whereon the coal rests. The lower doors $a^2$ at the rear side of the case are below the rear inclined grate $f^1$, and the upper doors $a^3$ are above said grate, and below each series of said grates are ash-pits N and $N^1$. Between the two series of inclined grates is a bed-plate or table, $A^1$, to receive coke from the front grates $f$, when thrust through a longitudinal aperture $e$ above and at the lower ends of the grates, which are a little above the top of the table, the latter being level with the lower ends of the rear grates.

The open space M beneath the table contains the flue L for receiving refuse matter from the gas-flue I above such refuse, which passes downward from I through vertical spouts or trunks D leading from one flue, I, to L. The opposite ends of the flues I and L are closed by removable stoppers. Above each series of front grates $f$ is a chamber, B, wherein coal is burned or roasted, to obtain the gases and vapors therefrom, and between each two coal-chambers is a gas and vapor mixing chamber, $D^1$, containing shelves or projections $d$ extending horizontally from the opposite side walls, and each more than half the distance from one wall to the other, and between each other or overlapping each other, the shelves projecting from one side between those projecting from the other side, so as to form suitable obstructions to divert the gas from its direct course downward, and thus to insure more perfect mingling of the gases and vapors, and considerably heating the gas by means of heat transmitted from the coal-chambers through the walls thereof. The gas-diverting obstructions may be dispensed with, and still gases and vapors will be mixed and heated while passing through the gas-mixing chambers, but not so rapidly or perfectly as by the use of said obstructions. The division-walls $k$ between the coal-chambers and the gas-mixing chambers are of metal, and the coal-chambers are lined with fire-brick in the usual way. Above each series of coal-chambers and gas-mixing chambers, and extending the whole length and width covered by such chambers, is a trunk, E, having inclined dividing-partitions $g$ extending from one side of the trunk to the other directly over the walls $k$, between the coal and gas mixing chambers, with gas-passages $h$ through each partition, and valves $b$ to be opened or closed upon said gas-passages, and operated from the outside by connected crank-levers $d^{11}$. Above each coal-chamber B is a coal-feeding hopper, $D^2$, having a closely-fitting cover, $h^1$, a coal-feeding gate or valve, $a^{22}$, each operated externally by a connected crank-lever, $b^1$, to open or close the valve or gate, and each hopper has an extension or side walls, $d^2$, to guide the coal directly into the chamber B below. Above each coal-chamber B, and in an opening through the top of the trunk E, I apply a concave socket, $c^1$, having an aperture, $c$, through the bottom thereof, and in this socket I place a closely-fitting ball, H, having a neck or stem, $g^1$, with a hole through the center of the neck and the ball, through which hole I insert a stirrer-bar, $E^1$, for stirring the coal in the chamber B. When not in use for stirring the coal the bar $E^1$ is withdrawn, and the ball turned or canted over, as shown in Fig. 2, when the side of the ball covers the aperture $c$, and prevents the escape of gas from or the admission of air into the chamber. The bar $E^1$ is introduced into and through the ball and its neck and closing the hole in the ball, while the latter is in the position shown in Fig. 2. Then turning the bar and the ball to the position shown in Fig. 5 brings the hole in the ball and the lower end of the bar over the aperture $c^1$, when the bar is easily thrust down among the coals to stir or break up adhesions therein without causing or allowing gas to escape through the ball or its connections. One or more apertures are made through the front of the case A, each opening into the space $B^1$ below the shelves $d$, and each covered or closed by a plug or stopple, $c^2$. The object of these apertures is to insert an instrument to clear the inclined bottoms of the chambers below the shelves.

Through the partition-wall at the back and lower side of each gas-mixing chamber are ports or apertures $E^2$ leading to each of the vertical trunks D for the passage of gas from the chambers $D^1$ through the trunks D to the gas-flue I, from which latter flue are ports or apertures $B^2$ through the rear side $f^3$ of the flue, and leading each to an inclined retort, $D^3$, a series of which retorts are placed above the rear grates and the table $A^1$, to receive, heat, and convey gas from the flue I to the stand-pipes $E^3$, and through these to the hydraulic main $H^1$. Instead of inclined retorts these may be placed each in a horizontal position, but, for convenience of construction of the apparatus, are inclined, to provide for the rear upper doors $a^3$ above the rear ends of the rear grates, and below the outer ends of the retorts. Each of the inclined retorts is suitably connected to the rear side of the gas-flue I, and, extending rearward, passes through the rear wall loosely to allow for expansion and contraction of said retorts. The rear end of each retort $D^3$ is supported by one of the stand-pipes by a cap or hood, P, connected to the lower end of the stand-pipe, and encircling and closely covering the end of the retort. Each stand-pipe $E^3$ is connected with the hydraulic main, and readily removable by a ball and socket, the former forming a close joint in the latter, and allowing of limited motion of the stand-pipe, or sufficient to remove the hood from the end of a retort without opening the ball-joint, the ball R being formed on the upper portion of the dip-pipe P′ and the socket $c^3$ in the upper side of the hydraulic main, or applied thereto. It will be understood that the outer end of each inclined retort $D^3$ is hung and supported by its connecting stand-pipe, and not dependent upon the rear wall for support. By this means I secure greater freedom of expansion of the retorts and less liability to fracture. Above the series of retorts $D^3$, and for the purpose of utilizing the waste heat rising from the fire on the rear grates $f^1$, is a steam-boiler, $A^2$, which is for generating steam to be used in the apparatus, and connected with this boiler is a steam-pipe, $h^2$, leading to a horizontal steam-pipe, $d^2$, which extends through the upper front corner of the front ash-pit N, beneath the upper ends of the front grate-bars $f$. This latter pipe has perforations $i$, through which steam is admitted to the ignited coal upon the front grates, the steam passing up between the grate-bars. Through the rear side of the trunk E, and above each coal-chamber B, is a smoke-flue, X, leading to a valve-box, $B^3$, provided with a valve, $g^2$, fitting a valve-seat, $e^1$, and from each valve-box a smoke-flue, $y'$, leads to the chimney $b$, the latter over the boiler-space $B^4$, where it receives and conveys off the smoke and waste gases from the coke burning on the rear grates, and beneath and around the retorts $D^3$. This combination of the valve-box and valve with the trunk E, the smoke-flues, and the chimney is intended to serve a twofold purpose: first, to allow the smoke to escape for awhile after starting the fire in the coal-chambers, and to arrest the gases after the fires are sufficiently kindled by operating the valve by hand, the upper portion $d^3$ of the stem being for the purpose of lifting the valve, which is automatically seated by its own weight, the lower end of the stem sliding vertically in a step, $h^3$, insures perfect action of the valve; the second purpose or object of the valve combinations is to provide for gas-explosions in the coal-chambers, and when these explosions occur the pressure and concussion suddenly lift the valve, which relieves the pressure by the exit of the excess of gases or the elements causing such explosion. At some convenient point near the gas apparatus, and in the present instance on the top of it, I place and secure my gas-exhausting and hydrocarbon-feeding apparatus, which consists essentially of a draft and forcing pump, S, a much larger gas exhausting and forcing pump, $R^1$, and a steam-cylinder, F, each provided with suitable appliances to render them operative, and all connected together.

The piston-rod $s^1$ extends through the steam-cylinder, and the gas-exhaust pump-cylinder, and its outer end $c^4$ extends outward beyond the end of the cylinder, where it is connected to the free end of an arm, $E^4$, one end of which is pivoted to a support, $d^4$, on which it swings. To the arm $E^4$ the piston $B^5$ of the pump $s$ is adjustably connected by a link or loop, $c^5$, which is easily moved to any part of the length of the arm, and nearer to or farther from the end connection of the piston-rod $s^1$. The latter, always moving the same distance and with the same length of stroke, imparts to the piston $B^5$ of the pump $s$ length of stroke or motion in proportion to its position of adjustment on the arm and if set at the center of the length of the arm its stroke will be but half the length of the stroke of the propelling piston-rod $s^1$, which, as it reciprocates, its piston-head $D^4$, operated by steam-pressure on the head $B^5$ of the steam-cylinder, will draw or exhaust gas from the apparatus in a certain quantity per stroke, and the pump $s$, or its piston and valves, will operate to draw and force into the apparatus hydrocarbon in a certain quantity, but, say, a little less than is necessary to supply sufficient illuminating power to the gas being produced from coal in the chambers B. To suitably increase the supply of hydrocarbon, the connecting-link $c^5$ of the piston $B^5$ is moved on the arm, say, to the indicating-scale line or mark 6, when the piston $B^5$ will receive a longer stroke, and will draw and force a larger quantity of hydrocarbon into the apparatus, and, if correctly adjusted, the pump $s$ will supply or feed into the apparatus the right quantity of hydrocarbon, or a quantity which will sufficiently enrich the coal-gas or impart to such gas the proper degree of illuminating power. Gas being constantly produced from the coal in the chambers B, and drawn out by the exhaust-pump, and enriched by the hydrocarbon, there is a proportionate action and result of the elements and mechanisms, and the graduated supply of hydrocarbon will be in proportion to the quantity of gas exhausted from the apparatus, or the quantity of gas drawn from the apparatus, and the illuminating power of the gas will be in proportion to and caused by the graduated supply of hydrocarbon forced into the apparatus by the hydrocarbon-pump, proportionate to the exhaust-pump, as described. The gas-exhaust pump may be of any common construction, and provided with suitable valves to render it successfully operative for exhausting gas from the apparatus and forcing it into the scrubbers, and through these and the purifiers into the gas-holder, gas being drawn from the hydraulic main, through the connected draft-pipe $A^3$, and forced out through a pipe $A^4$, leading from the exhaust-pipe to the scrubbers, as described. Hydrocarbon supplied to the apparatus is drawn from a tank through the pipe $d^5$ and the valves $c^6$, and forced out through the connected pipe $p$, and through branch pipes $p'$, into the trunk E, or the spaces $s^2$ thereon, above the series of shelves $d$, and, passing downward, and dropping from one shelf to another, it is vaporized, the vapor passing downward, as before described. By means of the pivoted arm $E^4$ and its figured scale the hydrocarbon-pump is readily adjustable by its link $c^5$, so as to shorten the stroke of the piston $B^5$ and cause the pump to draw and discharge into the space $s^2$ a less quantity of hydrocarbon whenever the quantity or condition of the coal-gas demands such a change, and all by simply moving the link $c^5$ and setting it, say, on the scale-mark or indicating-line 2 or 3, clearly shown in Fig. 7.

The operation of my above-described apparatus and the production of illuminating-gas therein are as follows: I first start the fires in the coal-chambers B, either with coke or anthracite coal, using suitable kindling material, and raising the valve in each smoke-pipe or box, and, at the same time, I start the fires on the rear grates beneath the inclined retorts, using coke and kindling material. The fuel on the front and rear grates being well ignited, and the rear fire continued, the latter imparts heat to the inclined retorts sufficient to cause them to superheat gas when passed through them. I now close the valve in each smoke-pipe or valve-box, and introduce bituminous coal through the hopper $D^2$ until each coal-chamber B is filled. At this time, and from the lower strata of the charge of bituminous coal in each chamber B, the production of coal-gas commences, continues, and increases, and there being no other natural escape, the gas passes downward and through the longitudinal aperture $e$ into the coke-chamber, and up between the inclined retorts, and out through the chimney $b$, but only for a brief space of time. I now start the gas-exhausting and hydrocarbon-feeding apparatus, and at the same time admit steam through the pipes $h^2$ and $d^2$, which steam escapes through the series of perforations $i$, and passing upward between the grate-bars, and comes in contact with a portion of the incandescent coke above the grates. Simultaneously with the introduction of steam air is let in through the doors $a$ and $a^1$ of the front ash-pits N, and passes upward with the steam and beyond where the steam enters, and into contact with the coke, where both the steam and air are decomposed by the incandescent coke, which abstracts the oxygen from each, producing a mixture of carbonic oxide, hydrogen, and nitrogen. The gases thus formed are drawn upward through the body of coal in each chamber B, where they are mixed with the gases and vapors being distilled from the bituminous coal. All these products are drawn from the top of each coal-chamber B, through the trunk E and the open gas-passages $h$, (the valves $b$ being opened,) into the spaces $s^2$, where they come into contact with the hydrocarbon introduced through the pipes $p'$. The gas passes onward and downward, being drawn by the exhauster, and at the same time the liquid hydrocarbon, deposited on the upper shelf $d$, or obstruction, drops upon the next shelf below, and so on downward, until it is all evaporated and mingled or mixed with the gases from the coal-chambers B, the hydrocarbon being introduced in quantity proportionate to the quantity of gases produced and exhausted, and sufficient to make the combined gas suitably illuminating. The combined or mixed gases and vapors are drawn from the bottom of each chamber $D^1$, through ports $E^2$, into and through the vertical trunks D, and from these to the longitudinal gas-flue I, and from this flue, through ports $B^2$, to the inclined retorts $D^3$, where the combined gases and vapors are superheated and permanently united. From the superheating-retorts the gas is drawn into and through the stand-pipes $E^3$ and the dip-pipes $P'$ to and through the hydraulic main $H^1$, and from this through the draft-pipe $A^3$ and the valve-furnished pipes of the exhaust-pump, and forced out through the pipe $A^4$ leading to the scrubbers, as described. While operating the gas apparatus, as above described, and at suitable intervals, and to feed the fires under the inclined retorts, I thrust a suitable bar or rake through the upper front doors $a$, and between the front grate-bars, and push the coke from the top of the front grates through the aperture $e$ onto the table $A^1$, from which it is drawn rearward to and upon the rear grates $f^1$ by a rake or scraper inserted and operated through the rear upper doors $a^3$.

The gases resulting from the combustion of the coke near the front grates in the chamber B have no illuminating power, and if produced in too great abundance would necessarily dilute or impoverish the otherwise rich illuminating-gases distilled from the coal above. To avoid this overdilution of the gas is another object of the removal of the coke through the aperture to the table and the rear grates, the coke at the bottom having been deprived of its products of illumination. When the bituminous coal in the chambers B is sufficiently rich in illuminating properties, or when the gas is not designed for illuminating, then the hydrocarbon may be dispensed with, and this is effected by simply disconnecting the link $c^5$ from the arm $E^4$, thus allowing the hydrocarbon-pump to remain at rest. When anthracite or semi-bituminous coal is used in the chambers B a larger proportion of hydrocarbon is required to make illuminating-gas than with bituminous coal, and, with this exception, the operation is substantially the same as when bituminous coal is used.

In the modification shown in Figs. 11, 12, and 13, Fig. 11 represents a vertical cross-section; Fig. 12, a horizontal cross-section; and Fig. 13, a vertical longitudinal section on the line $g^1$ of Fig. 11. In this modified apparatus, and by the construction of the gas-mixing chamber $D^1$ or chambers, back of the coal chamber or chambers B, and between the latter and the rear coke-burning chamber, furnace, or boiler-space $B^4$, I am enabled to avoid or dispense with the gas-flue I, the vertical trunks D, and the lower flue L, by connecting the inner ends of the inclined retorts directly with and covering the rear ports $B^7$ through the rear plate or wall of the gas-mixing chamber, thus simplifying the apparatus and its operation. In this and in the apparatus first described the inclined retorts are removable, and by removing one or more of them a portion or all the gas generated in the coal-chambers may be passed through the ports $B^7$ or $B^2$ into the boiler-furnace or coke-burning chamber, and then made available for making steam in the boiler, or for other purposes.

In my said gas apparatus, and in all the modifications herein described, and by reason of their construction and combination of parts, they are capable of producing, and do produce, both illuminating-gas and non-illuminating or heating-gas at the same time, and they deliver or convey each said kind of gas in a different direction, and use them for separate purposes, and this is done in the apparatus first described, and in the modified apparatus shown in Figs. 11, 12, and 13, by closing the rear doors $a^2$ $a^3$, when the draft of the chimney draws the non-illuminating gas from the burning coal or coke with the product of the steam and air there introduced through the aperture $e$ into the boiler-furnace or coke-burning chamber $B^4$, where it is consumed, while a portion of the gas produced from anthracite coal and from the vapor of hydrocarbon combined therewith, or from the illuminating-vapors distilled from bituminous coal at a low temperature, or these and the vapor of hydrocarbon, are drawn by the exhausting device downward through the gas-mixing chambers, and then through the highly-heated retorts, and off, as described.

In the apparatus shown in Figs. 14 to 19 inclusive, the non-illuminating gas is produced near the grate, and drawn out through the perforated lining into the space W, and off through the pipe or pipes $S^4$, while the illuminating-gas is drawn from the upper stratum of coal in the annular coal-chamber, and with the vapor of hydrocarbon down through the heated central gas-mixing chamber $D^1$ and the ash-pit $N^2$, and out through the pipe $E^5$, as described, and in this said apparatus the heat in the central gas-mixing chamber will be sufficient to fix the gas and make it incondensable, said heated chambers serving the same purpose of the gas-mixing chambers and the inclined retorts in the two apparatus first described.

I will here state that I contemplate constructing this modified apparatus with one, two, or more of the coal-chambers B arranged side by side; and, with the exception of the chamber $D^1$ at the rear of the coal-chambers B instead of between them, and the simplified construction and the connection of the inclined retorts, this last-described apparatus is intended to be substantially like that first above described, and provided with the same co-operative devices. If, at any time, the coke thrust through the aperture $e$ should be insufficient to suitably heat the inclined retorts, and superheat the gas drawn through them, additional coke or other fuel is placed upon the fires on the rear grates.

When the gas apparatus is constructed with a series of several coal and gas mixing chambers, as first above described, any number of such coal-chambers less than the whole may be fired up and supplied with coal, and gas produced therein, as described, and the gas passed—say, from two of the coal-chambers B—into and through one of the gas-mixing chambers by closing one of the gas-openings by its valve $b$, and leaving the other valve open, as in Fig. 1.

The modified apparatus shown in Figs. 14 to 19, inclusive, consists essentially in the construction of the coal-chamber B in a single annular space, and the gas-mixing chamber $D^1$ directly in the center, and having suitable obstructions $d$ to divert the gas from a direct downward course, as in the mixing-chambers first above described; but in this modification the obstructions may be alternate annular shelves and disks $d$, or scrap-iron, chain, or other suitable material that will serve the purpose described. At the bottom of the central annular gas-mixing chamber $D^1$ is a tilting grate, $g^3$, to support the chain or other loose obstructions, and when producing gas for heating purposes, for supporting incandescent coal, the grate being capable of turning either edge upward by a rod, $b^2$, to empty the contents of the chamber above into the ash-pit $N^2$, or to shake the grate and free it from ashes, the ash-pit having a door, $a^{33}$, at the mouth of a trunk, $I'$, leading to the ash-pit. At the bottom of the annular coal-chamber is a series of grates, $a^4$, supported by radial operating-rods $b^3$. The inner end of each said rod works in a socket in or upon the outer surface of the inner cylindrical chamber-wall, and the outer end of each rod works in and through the outer wall $D^5$ of the upper ash-pit $N^3$, beneath the annular coal-chamber. The ash-pits $N^3$ are provided with doors $a^{44}$ through the outer wall for admission of air and removal of ashes. From the rear side of the lower ash-pit $N^2$ is a pipe, $E^5$, for conveying gas from the apparatus, and passed or drawn from the annular coal-chamber downward through the central gas-mixing chamber, and through incandescent coal, or over and upon obstructions $d$, as before described. Above the annular coal-chamber and the central gas-mixing chamber I construct a cylindrical trunk, E, which, in all other respects, is like the trunk E on the apparatus first above described, and it is furnished with like coal-feeding hoppers, with the ball and socket and coal-stirring bar, and with a smoke-pipe, X, valve-box $B^3$, and valve $g^2$ all operated in like manner, and the gas drawn from the top of the coal-chamber downward through the mixing-chamber and its obstructions to the ash-pit $N^2$ and out at the rear pipe $E^5$. Surrounding the coal-chamber is the annular boiler $A^5$ for generating steam to be used in the apparatus, and steam is generated in the boiler by heat transmitted through the outer lining and the outer wall $H^2$ of the coal-chamber, which is also lined with fire-brick in circles around the central gas-mixing chamber. Steam is supplied to sections or portions of the coal upon the grates $a^4$, through a pipe, $d^6$, leading from the boiler, and from this pipe to and through the annular pipe $d^7$ at the bottom of the apparatus, and from the pipe $d^7$ through vertical pipes $g^4$ into and through conduits $g^5$, between and at a level with the top of the grates, the conduits being constructed on the tops of partitions dividing the ash-pit $N^3$, and in triangular form in their cross-section and with open fissures $n$ leading from the whole length of and beneath their tops or covers.

The steam, passing horizontally from these fissures, rises and comes in contact with sections only of the ignited coal upon the grates, leaving other and intervening sections of coal, through which air only comes in contact. In this way free combustion of the coal is constantly maintained between, and materially aiding in the support of combustion of coal in the adjoining sections or portions, through which the steam is applied, and substantially the same effect or result is produced in the apparatus first described by the steam from the pipe $d^2$ passing between the grate-bars at and near their upper ends, while air only passes through the remainder of the grate-surface. As in the apparatus first described, the steam and air are decomposed by the coal, and with the same results; and hydrocarbon, when used, is admitted or forced into the top of the chamber $D^1$ through a pipe, $g^6$, in like manner as through the pipes $p'$, into the gas-mixing chambers first-above described.

By predetermined construction of the apparatus shown in Figs. 1 to 13 inclusive, it is capable of operating to produce hydrocarbon or oil gas of any desired illuminating power, by diluting the rich hydrocarbon or oil gas with the products of combustion of the carbon on the front grates, or on both the front and rear grates $f$ and $f^1$, together with the steam and air decomposed in the coal-chambers B, and air in the rear coke-chamber, beneath and around the inclined retorts, and this is done by charging the chambers B and $B^4$, on their grates $f$ and $f^1$, with anthracite or other coal or coke which contains little or no element or property of illumination, and igniting such coal or coke, and continuing the fires until and after the gas-mixing chambers and their gas-obstructions have become suitably heated to vaporize the liquid hydrocarbon, and the inclined retorts so heated as to superheat the gas passed through them. I then introduce liquid hydrocarbon and exhaust the gas by means of the described apparatus, and at the same time admit steam and air through the grates $f$. Air being admitted through the opened front doors $a$ and $a^1$, the products of the burning coal or coke and the steam and air will dilute the rich hydrocarbon gas produced by evaporating the liquid hydrocarbon, and if the diluting agent is insufficient I close the front doors and open the rear doors $a^2$ and $a^3$, and close the damper or valve $F^2$ in the chimney, thus admitting air to the rear fires, and causing the exhaust-pump to draw the carbonic-acid gas and other products of the rear fires through the longitudinal apertures $e$ into the coal-chambers B, where the carbonic acid is reduced to carbonic oxide, and passed upward through the coal in said chambers, and mixing with the hydrocarbon-gas as they pass together and mingle in the gas-mixing chambers, and by properly regulating the drafts or currents of air, steam, and carbonic acid, the hydrocarbon-gas may be thus produced of any desired illuminating-power, and the carbonic acid from the rear fires on the grates $f^1$ will be advantageously utilized, whereas, in the production of hydrocarbon or oil gas in most of the gas apparatus heretofore known or in use, the diluting agent and the means of generating the same are wholly absent and wanting, in order to produce gas of such an illuminating standard as to be adapted to burners of ordinary size—undiluted-oil gas requiring very small burners, and even then being very liable to smoke, such undiluted-oil gas being about eighty-candle power, when it should be diluted to from sixteen to twenty candle power, when it will be about the standard of ordinary coal-gas. Atmospheric air has been used to dilute hydrocarbon or oil gas, but this is a wasteful and injurious process, inasmuch as the free oxygen combines with a portion of the illuminating matter, converting it into carbonic oxide in the body of the flame. Thus it does not merely dilute the illuminating matter, but destroys it, as may be fully illustrated by mixing atmosperic air with ordinary coal-gas.

Thus it will be seen that my described gas apparatus is capable of operating to produce gas from rich bituminous coal alone, or from poorer bituminous coal, or anthracite coal, and oil or liquid hydrocarbon, or from oil or liquid hydrocarbon and diluted with the products of the poorer coal, and steam and air, and by the addition of carbonic-acid gas to form carbonic oxide, all substantially as described. It will also be seen that whether the oil is distilled from the bituminous coal or introduced through pipes to the gas-mixing chamber, it is in the form of vapor when combined with such a proportion of the non-illuminating gas from near the grates as to be suitably diluted to any desired standard of illumination, and while in this condition it is exposed in the retorts $D^3$ to a sufficiently high temperature to permanently unite the gases and vapors, and by the process to convert nearly all the tarry matter, and avoiding the usual waste of gas-producing material.

Figure 14:
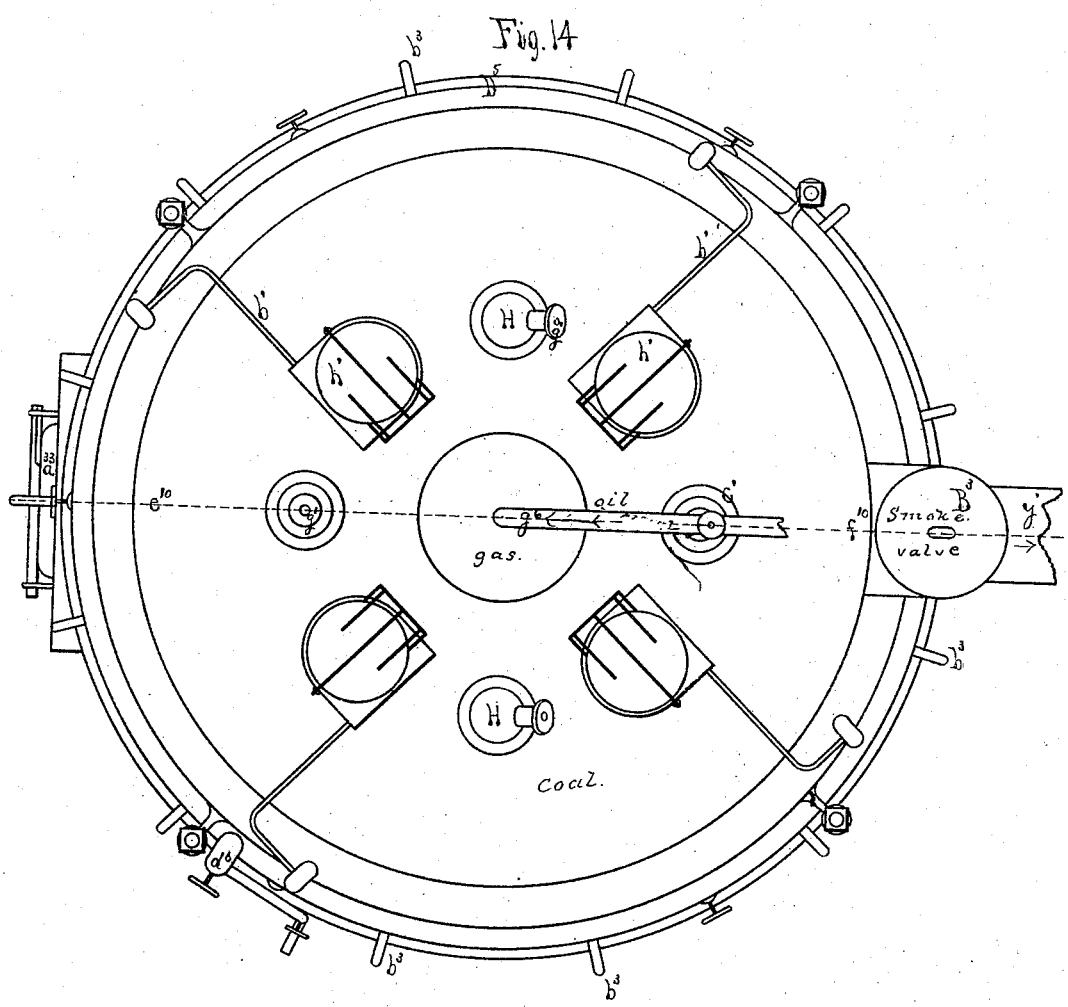
Figure 15:
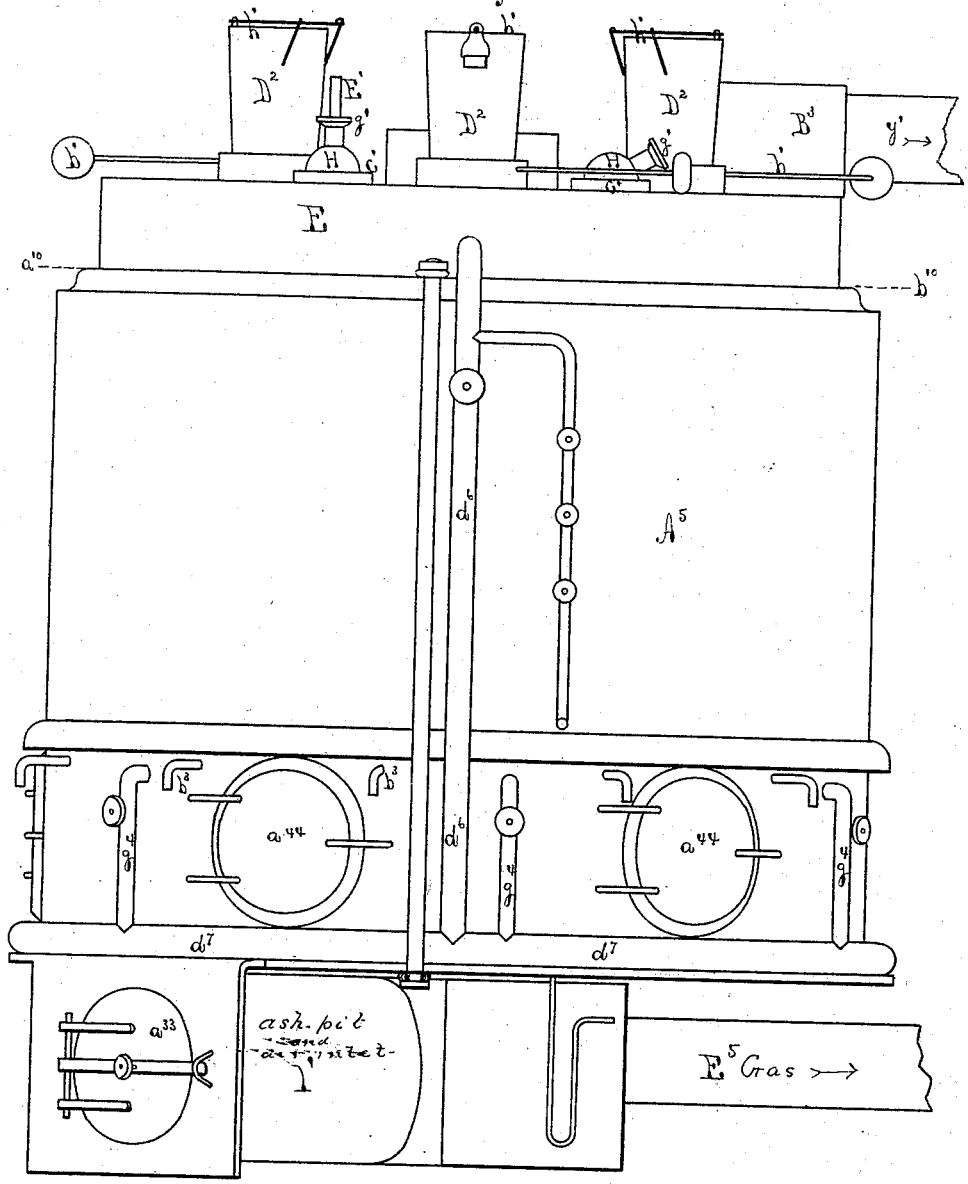
Figure 16:
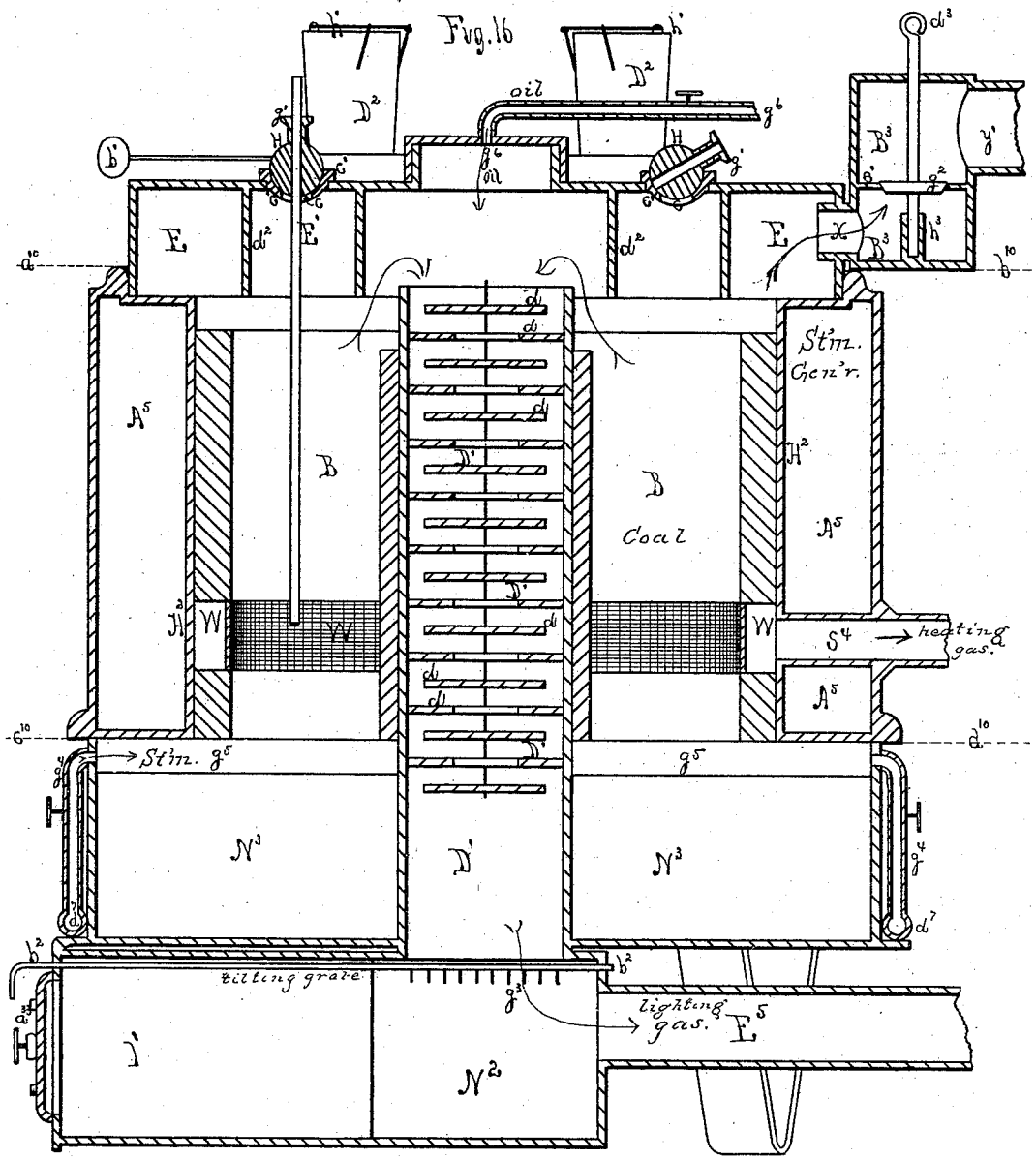
Figure 17:
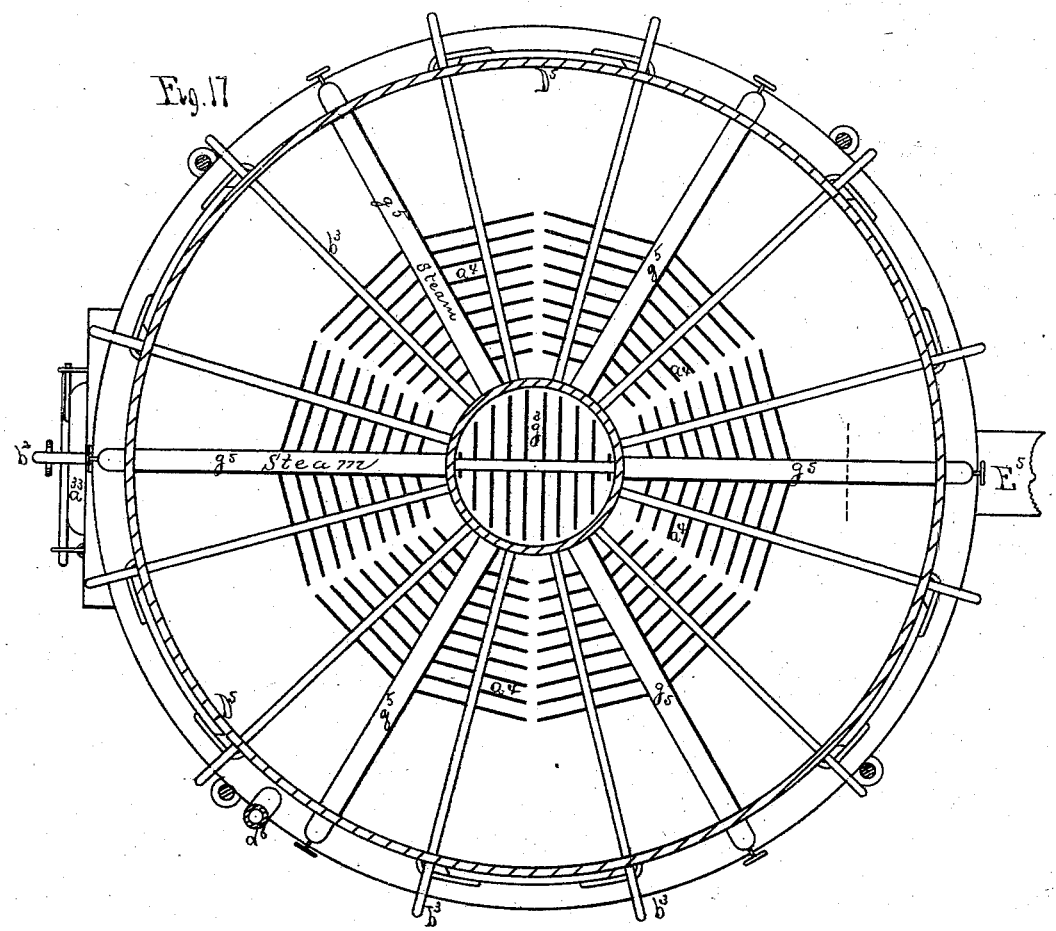
Figure 19:
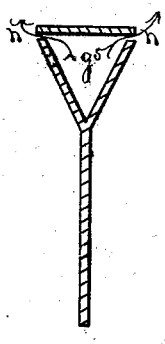

In the apparatus shown in Figs. 14 to 19 inclusive, and seen in Fig. 16, there is a lower hollow perforated section, W, of the outer lining, and a connected pipe or pipes, $S^4$, leading from the space W through the steam-boiler $A^5$, for the purpose of conveying off a portion of the non-illuminating gases resulting from combustion of the carbon near the grate, and as in the apparatus, shown in Figs. 1 to 13, inclusive, where such gas passes through the aperture $e$, and for the same purpose, viz: to prevent overdilution of the rich gases produced from bituminous coal and distilled at a low temperature, and it will be understood that the apparatus shown in Figs. 14 to 19 inclusive is fully capable of producing hydrocarbon gas by using the described hydrocarbon feeding device, and the gas-exhausting device, and its operating mechanism, all of which are as readily applicable to this as to the apparatus shown in Figs. 1 to 13, inclusive, and the oil or hydrocarbon forced into the space above the mixing-chamber, through the pipe $g^6$, shown in Figs. 14 and 16.

I claim as my invention—

1. One or more coal-chambers, B, having grates $f$, and leading to longitudinal apertures $e$, in combination with one or more gas-mixing chambers $D^1$, having shelves $d$, or gas-diverting obstructions, and bottom ports $E^2$ leading to trunks D, and all covered by a trunk, E, provided with coal-feeding hoppers $D^2$, substantially as described.

2. The dividing-partitions $g$, having gas-passages $h$ and externally-operated valves $b$, in combination with the trunk E, coal-chamber B, and gas-mixing chambers $D^1$, substantially as described.

3. One or more coal-chambers, B, having grates $f$, and leading to longitudinal apertures $e$, in combination with one or more gas-mixing chambers, $D^1$, provided with shelves $d$, or gas-diverting obstructions, and bottom ports $B^7$, leading to inclined retorts $D^3$, and with a trunk, E, provided with coal-feeding hoppers $D^2$, substantially as described.

4. The combination, in a gas apparatus, of one or more trunk-covered coal-chambers, B, having grates $f$ and apertures $e$, and one or more gas-mixing chambers, $D^1$, the vertical trunk or trunks D, and longitudinal gas-flue I and flue L, the inclined retorts $D^3$, the rear coke-chamber $B^4$, having grates $f^1$, and a table or bed-plate, $A^1$, between the front and rear grates, substantially as described.

5. The combination, in a gas apparatus, of one or more trunk-covered coal-chambers, B, having grates $f$ and apertures $e$, and one or more gas-mixing chambers, $D^1$, the inclined retors $D^3$, the rear coke-chamber $B^4$, having grates $f^1$, and a table or bed-plate, $A^1$, between the front and rear grates, substantially as described.

6. The combination, in a gas apparatus, of one or more trunk-covered coal-chambers, B, having grates $f$ and aperture $e$, and one or more gas-mixing chambers, $D^1$, the rear coke chamber or furnace $B^4$, having grates $f^1$ and a table or bed-plate, $A^1$, between the front and rear grates, substantially as and for the purpose described.

7. The open-bottom socket $c^1$, and the ball H and bar $E^1$, constructed as described, with a hole in the ball for the bar $E^1$, in combination with the coal-chamber, and capable of turning to close the aperture $c$, and to expose the latter to the hole in the ball, and to permit the insertion of the bar to the coal-chamber, substantially as described.

8. The combination, with the stand-pipes $E^3$, of the caps or hoods P, connecting and supporting the retorts $D^3$, and the balls R and sockets $c^3$, for adjustably and removably connecting the stand-pipes with the retorts and with the hydraulic main, substantially as described.

9. The combination, in a gas apparatus, of an adjustable hydrocarbon or oil-feeding device, a gas-exhausting device, and a feed and a single mechanism, operating both the feed and exhaust, substantially as described.

10. The valve-box $B^3$, and its valve $g^2$ and seat $e^1$, in combination with the smoke-flues X and Y, and with the trunk E and coal-chamber B, substantially as described.

11. The combination of the hydrocarbon-feeding device and the gas-exhausting device, whereby the feed and exhaust of the retort are proportionately regulated, substantially as described.

12. The gas-exhausting device and its steam-operating mechanism, in combination with the trunk E, coal-chamber B, gas-mixing chamber $D^1$, retorts $D^3$, stand-pipes $E^3$, and the hydraulic main H, substantially as described.

13. The combination, in a gas apparatus, of a coal-chamber, B, having grates, as set forth, a gas-mixing chamber, provided with shelves or gas-diverting obstructions, as specified, and covered or connected by a trunk, E, having coal-feeding hoppers, all substantially as described.

14. The longitudinal flues $e$, leading from the coal-chambers B to the rear chamber $B^4$, for the passage of coke from the front grates $f$ to the bed-plate $A^1$, and to the rear grates $f^1$, and also as a passage for gas from the front to the rear chamber, substantially as described.

15. The process of producing illuminating-gas by distilling and vaporizing at a low temperature the oils from bituminous coal, mixing these oil vapors with the gases rising from the resultant hot coke in contact with steam and air, at or near the base of the coal-burning retort, further mixing and heating these mingled vapors, by passing them downward through heated chambers, and finally by fixing the heated mixture in highly-heated retorts, substantially as set forth.

16. The process of producing illuminating-gas by distilling and vaporizing at a low temperature the oils from bituminous coal, mixing these oil vapors with the gases rising from the resultant hot coke in contact with steam and air, at or near the base of the coal-burning retort, adding to these commingled vapors and gases, the vapors of a liquid hydrocarbon, further mixing and heating these mingled vapors by passing them downward through heated chambers, and finally by fixing the heated mixture in highly-heated retorts, as set forth.

17. The process of producing illuminating-gas by the partial combustion of anthracite coal in contact with steam and air, at or near the base of the coal-burning retort, adding to them commingled vapors of a liquid hydrocarbon, further mixing and heating these mingled vapors by passing them downward through heated chambers, and finally by fixing the heated mixture in highly-heated retorts, substantially as set forth.

18. A gas apparatus, constructed substantially as described, viz: with trunk-covered coal-chambers B, having grates $f$, a rear coke chamber or furnace, $B^4$, leading to the chimney, with aperture $e$ leading from one chamber to the other, with gas-mixing chambers $D^1$, and retorts $D^3$, and steam-pipes $h^2 \, d^2$, and openings or doors $a^1 \, a^2$, to supply steam and air to the fire on the grates $f$, and an operating gas-exhausting device, or this and a hydrocarbon-feeding device, whereby non-illuminating gas and illuminating-gas are both produced simultaneously, substantially as described.

19. The process, substantially as herein described, of producing non-illuminating gas and illuminating-gas simultaneously in the same gas apparatus, and of delivering each said kind of gas in a different direction and for different purposes, which consists in producing, first, non-illuminating gas from the partial combustion of anthracite coal or coke in contact with steam and air introduced and combined therewith near the base of a coal-burning retort, and drawing off such gas for consumption in an adjoining furnace, as specified, and which further, and secondly, consists in simultaneously producing illuminating-gas from the remaining portion of the gases resulting from the partial combustion of anthracite coal or coke, and the steam and air drawn upward from the upper stratum of such incandescent coal or coke, and permanently combining such gases with the vapors of hydrocarbon, or producing illuminating-gas from the oily vapors distilled from bituminous coal at a low temperature, and vaporized and exhausted or drawn from an upper stratum of unignited coal, thence passed downward through highly-heated gas-mixing chambers, or through these and highly-heated retorts, all substantially as described.

MOSES W. KIDDER.

Witnesses:
FISHER A. WILDER,
JOHN E. CRANE.